Oct. 14, 1958
C. P. FLETCHER
2,856,479
INHIBITOR SWITCH FOR AUTOMATIC TRANSMISSIONS
Filed Jan. 7, 1957
2 Sheets-Sheet 1
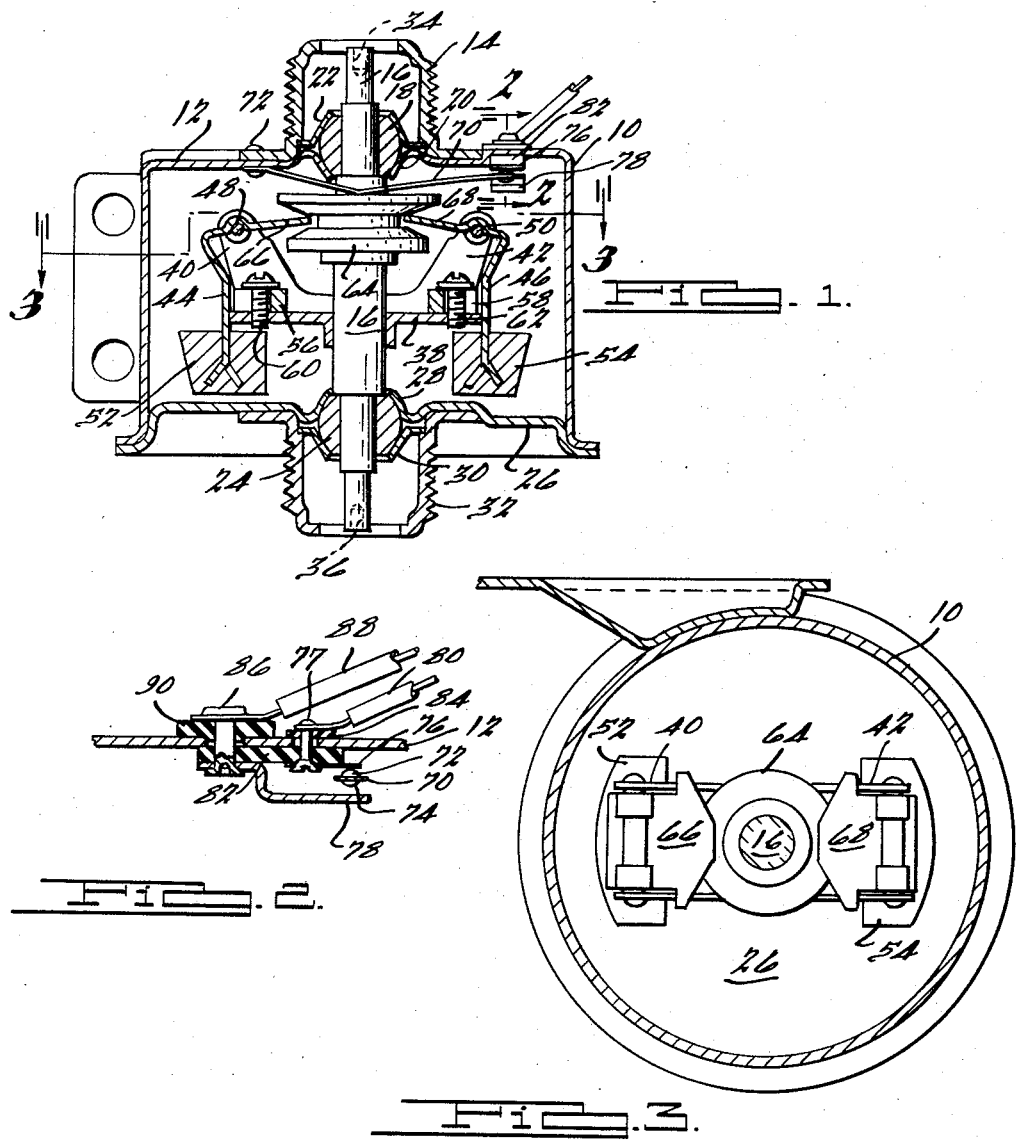
INVENTOR.
Cicero P. Fletcher
BY Oct. 14, 1958  C. P. FLETCHER  2,856,479

INHIBITOR SWITCH FOR AUTOMATIC TRANSMISSIONS

Filed Jan. 7, 1957  2 Sheets-Sheet 2

INVENTOR.
Cicero P. Fletcher
BY

United States Patent Office 2,856,479
Patented Oct. 14, 1958

2,856,479

INHIBITOR SWITCH FOR AUTOMATIC TRANSMISSIONS

Cicero P. Fletcher, Mount Clemens, Mich., assignor to Ford Motor Company, Dearborn, Mich., a corporation of Delaware Application January 7, 1957, Serial No. 632,747

3 Claims. (Cl. 200—80)

My invention relates generally to power transmission mechanisms and, more particularly, to a control for a power transmission mechanism comprising a new and improved operating speed responsive electric switch capable of energizing and de-energizing a control element of a transmission control circuit. My invention is particularly adapted to be used with the controls of a multiple speed, automatic power transmission of the automotive type wherein the vehicle operator may make a manual selection of any of several transmission operating speed ratios.

I am familiar with several automotive type automatic power transmissions wherein a manually operable drive range selector device is situated within the driver compartment of the vehicle for conditioning the transmission for various forward driving ranges, for reverse range, and for neutral. One automotive transmission commonly used in the industry also includes a parking detent or pawl for braking the transmission tail shaft to the housing, and this may also be operated manually from within the driver compartment. Since it is quite undesirable to allow the transmission to shift into reverse range or to engage the parking pawl while the vehicle is operating at relatively high speeds, a suitable inhibitor may be included within the transmission controls for preventing a shift into reverse or park at vehicle speeds greater than a desired maximum value.

A transmission control mechanism having this reverse and park selection feature and embodying such an inhibitor is disclosed in the pending application of Jovanovich et al., Serial Number 597,425, which is assigned to the assignee of my instant invention. The control mechanism of this pending application comprises dash board mounted selector elements having a mechanical connection with the transmission shift control valves which in turn function to establish the desired shift pattern. A latching element is mounted adjacent the individual selector elements corresponding to reverse drive range and to the park condition, and a solenoid is provided for moving the latching element into the path of movement of the reverse and park selector elements when the same is energized thus preventing a shift by the vehicle operator. The selector element corresponding to the park condition is included within the selector mechanism as part of a motion transmitting linkage for engaging the parking pawl.

The switch mechanism of my instant invention forms a portion of the circuit for the above mentioned solenoid and it comprises a rotatably mounted shaft upon which are pivotally carried a pair of opposed weights, suitable arms being provided for this purpose. A portion of each arm is adapted to engage a spool element slidably situated on the shaft, said spool element being movable axially by the arms as the weights are urged outwardly due to centrifugal force as the speed of rotation of the shaft is varied in magnitude. The spool element is adapted to engage a switch element and to open and close associated contacts, said contacts being in series with the above mentioned solenoid. The rotatably mounted shaft may be manually connected to the transmission tail shaft by means of a suitable flexible cable and worm gear reduction drive thereby establishing a fixed relationship between the vehicle speed and the speed of rotation of the shaft.

A principal feature of my invention resides in a snap action which is obtained when the contacts open or close. This is accomplished by mounting two permanent magnets on the rotating shaft so that they exert a magnetic attraction on the arms carrying the centrifugal weights. According to another feature of my invention, the above mentioned switch may be made double acting by providing a second set of contacts which the switch element engages as it moves out of engagement with the above mentioned switch contacts. This second set of contacts and the associated switch element may form a portion of a solenoid valve circuit associated with a "no creep" braking device for the vehicle wheels.

The provision of an improved inhibitor switch of the type above described being a principal object of my invention, it is a further object to provide a simplified switch which functions in response to vehicle speed to open and close one or more circuits associated therewith.

It is another object of my invention to provide a speed responsive switch mechanism as set forth in the preceding objects wherein centrifugally operated elements are used to impart motion to the relatively movable components of the switch.

It is a further object of my invention to provide a speed responsive switch as set forth above wherein electrical contacts thereof may be opened and closed with a snap action thereby eliminating arcing.

It is a further object of my invention to provide an inhibitor switch of the double acting type which is capable of opening and closing a solenoid circuit for a shift inhibitor element of a transmission selector mechanism while simultaneously controlling the operation of an auxiliary vehicle control circuit.

Another object of my invention is to provide a switch as set forth in the preceding object wherein the solenoid circuit and the auxiliary control circiut are alternately opened and closed.

For the purpose of more particularly describing my instant invention, reference will be made to the accompanying drawings wherein:

Figure 1 is a cross sectional view of the inhibitor switch showing the mode of cooperation between the principal elements thereof;

Figure 2 is a detailed sectional view taken on section line 2—2 of Figure 1 showing the contact elements of the switch of Figure 1;

Figure 3 is a transverse cross sectional view of the switch mechanism of Figure 1 and is taken along section line 3—3 of Figure 1;

Figure 4:
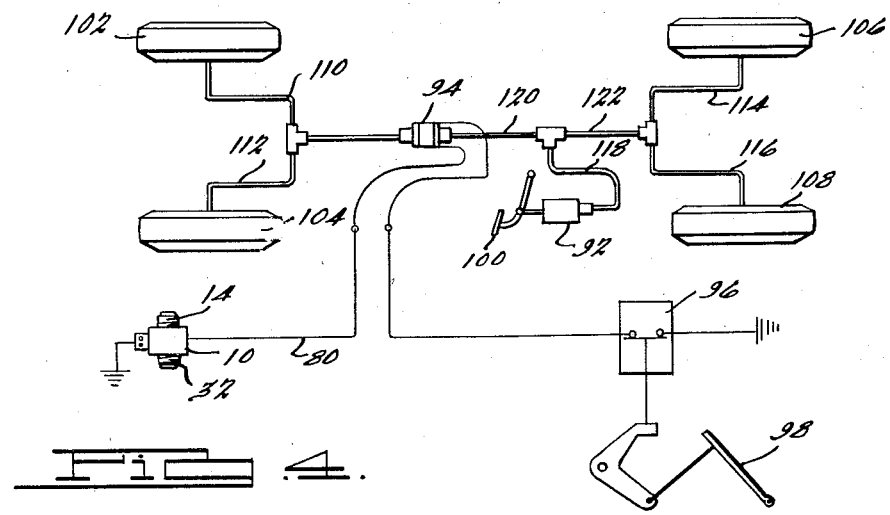
Figure 4 is a schematic representation of the hydraulic braking system of a vehicle incorporating a solenoid valve capable of accomplishing a "no-creep" braking effort, said solenoid valve comprising an auxiliary circuit capable of being controlled by the switch mechanism of Figure 1.

Referring first to the preferred embodiment of my invention as illustrated in Figure 1, numeral 10 is used to designate a cylindrical housing which includes an upper end cover 12 upon which is mounted an enclosure 14 for the upper end of a rotatably mounted shaft 16. The shaft 16 extends axially through the housing 10 and is rotatably journaled at one end thereof by a suitable bearing 18, said bearing comprising a bushing retained within a central aperture in the top cover 12, suitable bearing retainer means 20 and 22 being provided for this purpose. The other end of the shaft 16 is rotatably journaled by another bearing element 24 mounted within a central aperture formed in an end cap 26 closing the other end of the housing 10. Bearing 24 also includes suitable bearing retainer means 28 and 30. A lower enclosure 32 surrounds the lower end of the shaft 16. The ends of the shaft 16 may each be formed with a socket, as indicated by means of dotted lines in Figure 1 at 34 and 36, to accommodate a connection with a speedometer cable which normally extends from the vehicle speedometer to a worm and worm gear mechanism on the transmission tail shaft. By preference, the enclosures 14 and 32 may be externally threaded to facilitate a connection with the ends of the associated speedometer cables. The shaft 16, therefore, rotates with the speedometer cable at a speed which is a direct function of the vehicle speed.

A carrier member or bracket 38 is fixed to the shaft 16 within the housing 10 and it includes arms 40 and 42 situated on opposed sides of the axis of the shaft 16. The arms 40 and 42 provide a pivotal support for angularly shaped levers 44 and 46 respectively, the pivot points for the latter being designated by numerals 48 and 50. The levers 44 and 46 extend in a downward direction and they are each adapted to carry a weight as shown at 52 and 54. By preference the weights 52 and 54 are formed of lead although I contemplate that other materials may be employed for this purpose.

The bracket 38 is adapted to carry a pair of permanent magnets, as indicated at 56 and 58, at points adjacent to the associated levers 44 and 46. The permanent magnets 56 and 58 may be secured to the bracket 38 by suitable bolts 60 and 62 respectively and they may be situated with their magnetic poles directly adjacent to the levers 44 and 46 when the latter are in the position shown in Figure 1 thereby causing a magnetic attraction between the levers and the magnets.

The other end of each levere 44 and 46 extends in a substantially radial direction and is situated in adjacent, cooperating relationship with respect to a spool 64, the latter being slidably carried by the central shaft 16. The spool 64 includes a circular groove within which the radially inword ends of the levers 44 and 46 are disposed, said radially inward ends being designated by numerals 66 and 68.

The spool 64 is adapted to engage a leaf spring element 70 which may be anchored at one end thereof to the end wall 12 of housing 10 as shown at 72 which in turn may be connected to a battery lead in the usual fashion. As best seen in Figure 2, the other end of the leaf spring element 70 may carry a pair of opposed contact elements 72 and 74 which are situated between a pair of contact plates 76 and 78 respectively. Plate 76 may be secured to the wall 12 of the housing 10 by an electrically conductive rivet 77 thereby providing an electrical connection between the plate 76 and an external lead 80. Appropriate insulators 82 and 84 may be provided as shown. Similarly, contact plate 78 may be connected to the end wall 12 of the housing 10 by another electrically conductive rivet 86 to provide an electrical connection between the plate 76 and another external lead 88. The insulator 82 and another insulator 90 may be employed as indicated to electrically insulate the lead 88.

The electrical lead 88 may extend to a solenoid associated with the latching element located within the transmission range selector mechanism, the latter being mounted on the vehicle dash board structure as previously explained. The solenoid circuit will be closed when the contact element 74 engages the contact plate 78 thereby providing an uninterrupted connection with the battery. For a detailed description of this transmission selector mechanism, reference may be made to the above mentioned pending application of Milton Jovanovich et al.

For the purpose of describing the auxiliary circuit associated with the electrical lead 80, reference will now be made to Figures 4 and 5 wherein Figure 4 discloses a vehicle wheel hydraulic braking system which includes a master brake cylinder 92, a solenoid valve 94, an accelerator switch 96, a personally operable accelerator pedal 98 and a personally operable brake pedal 100. The vehicle wheels are shown at 102, 104, 106, and 108 and they each may comprise conventional hydraulic braking devices having a brake wheel cylinder and piston for energizing the same. Fluid pressure conduits extend to each of the wheel cylinders as illustrated at 110, 112, 114, and 116 respectively and they in turn communicate with the master brake cylinder 92 through a main brake fluid pressure line 118 and branch lines 120 and 122.

Figure 5:
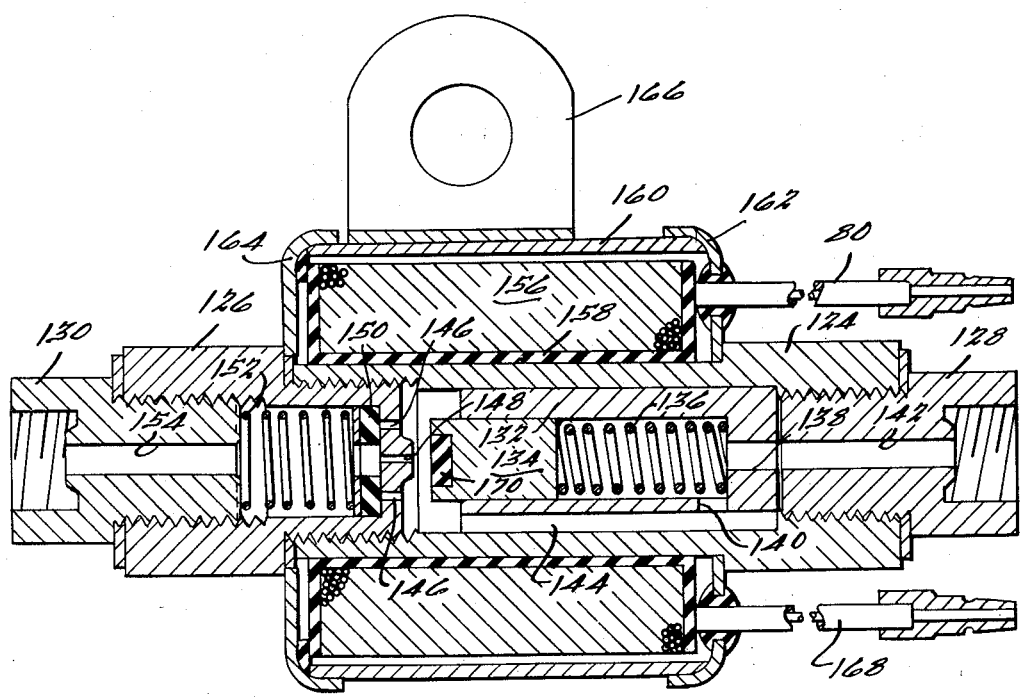
Figure 5 is an enlarged sectional view of the solenoid valve shown schematically in Figure 4.

The solenoid valve 94 forms a portion of the branch line 120 and it is illustrated in detail in Figure 5. The valve in Figure 5 comprises a cylindrical core formed of two portions as indicated at 124 and 126, said portions being threadably connected as indicated. A fluid inlet adapter 128 is threadably received within one end of the core portion 124 and a fluid outlet adapter 130 is threadably received within core portion 126. The core portion 124 is formed with a hollow interior adapted to slidably receive a valve plunger 132 which, in turn, is formed with a hollow cylindrical interior capable of receiving a plug 134, the latter being urged in an outward direction by an internally positioned spring 136. The plunger 132 is formed with a longitudinal opening 138 and a radial opening 140 to provide communication between a central opening 142 in the inlet adapter 128 and a side groove 144, the latter extending to the inner chamber of the core portion 124 on the left side of the plunger 132 as viewed in Figure 5. The interior of the core portion 126 communicates with the interior of the core portion 124 through openings 146 and 148 which are formed in a separating wall between the core portions as indicated. The openings 146 are adapted to be closed by a check valve in the form of a washer 150 seated against the openings 146 by compressor spring 152. The spring 152 is seated against the outlet adapter 130 which is centrally apertured at 154. The core portions 124 and 126 are surrounded by electrical solenoid windings 156 and a suitable insulator material 158 is interposed between the windings and the core portions 124 and 126. The solenoid windings 156 may be enclosed by an outer casing 160 and annular end plates 162 and 164 may be disposed on either side of the windings 156 in cooperation with the casing 160 and the core portion 124 and 126. A suitable bracket 166 may be secured to the casing 160 for mounting purposes. The above mentioned lead 80 may be connected to one terminal of the solenoid windings 156 and the other terminal of the windings may be connected to a battery lead illustrated in Figure 5 by numeral 168.

During operation of the braking mechanism the vehicle operator depresses the brake pedal 100 thereby creating pressure in the master brake cylinder 92 which is distributed to the various cylinders by the associated brake pressure lines 110, 112, 114, and 116. When the braking fluid passes from the passage 120 to the wheel cylinders associated with the rear traction wheels 102 and 104, the solenoid valve shown in Figure 5 accommodates the transfer of fluid to the rear wheel cylinders, the fluid passing from line 120 through the centrally apertured adapter 128, through openings 138 and 140, through groove 144 and through openings 146 and 148 to the opening 154 in the outlet adapter 130. As the vehicle decelerates as a result of the braking effort, the speed of rotation of the shaft 16 of the switch mechanism of Figure 1 becomes reduced. When the speed of rotation of shaft 16 falls below a predetermined magnitude, the magnets engage the associated levers 44 and 46 thus causing the spool 64 to shift in an upward direction to close the contact 72 against the contact plate 76 thereby closing the electrical circuit for the solenoid windings 156. The plunger 132 will then become seated against the core portion 126 and the plug 134 will block passage 148, a suitable resilient material 170 being provided for this purpose. When the plunger 132 is in the energized position spring 136 maintains the plug 134 in a passage closing position. When the vehicle operator relieves his foot from the brake pedal the fluid pressure in the rear wheel cylinders becomes trapped by reason of the operation of the check valve 150 and the plunger 132. The rear wheel cylinders will, therefore, remain applied thus preventing an undesirable creep while the vehicle engine is idling and while the vehicle is stopped. When the vehicle operator desires to set the vehicle in motion, he will press the accelerator 98 thereby opening switch 96 which is in series with the solenoid windings 156. The plunger 132 therefore assumes a full floating position permitting fluid pressure to escape through opening 148 from the rear wheel cylinders thus releasing the rear wheel brakes.

It will be apparent from the above description that the centrifugal weights 52 and 54 and associated levers 44 and 46 will remain in engagement with the poles of the magnets 56 and 58 respectively during acceleration of the vehicle until a predetermined speed is reached. At this predetermined speed the magnetic attraction between the magnets and the associated levers 44 and 46 will immediately be reduced to a negligible value thus permitting the levers 44 and 46 to quickly pivot about their respective pivot points to open the solenoid valve circuit and close the shift inhibitor circuit with a snap action. By preference, this snap action takes place at vehicle speeds of approximately seven to nine miles per hour. When the vehicle decelerates the centrifugal weights 54 and 52 will remain in the radially outward position until the magnetic attraction between the magnets 56 and 58 is sufficiently great to overcome the centrifugal force at which time the levers 44 and 46 will be snapped into the position shown in Figure 1 thus quickly opening the shift inhibitor circuit while quickly closing the solenoid valve circuit.

It is to be understood that under the patent statutes, I am entitled to describe and claim my invention in terms not specifically limited to the exact construction shown in the pictorial demonstration or stated in the written description thereof, and that one skilled in the art may devise analogous constructions embodying the new teachings of this disclosure, with many and sundry variations, without departing from the spirit or principles of my invention, and therefore I do not intend the invention to be circumscribed in scope in any way other than set forth in the appended claims, wherein I claim:

1. A switch mechanism comprising a casing, a shaft rotatably journaled in said casing, a carrier member secured to said shaft, a spool slidably carried by said shaft, a pair of weights situated on opposite sides of said shaft, lever means for pivotally mounting said weights on said carrier member including portions engageable with said spool for axially positioning the same, said weights being urged radially outward by centrifugal force as said shaft is rotated, an electrical circuit breaker including a movable contact element engageable with said spool and actuated thereby as the speed of rotation of said shaft changes, and magnets mounted on said carrier member adjacent said lever means for urging said weights toward a radially inward position thereby causing said weights to move quickly from one radial position to another with a snap action, said circuit breaker further including a stationary contact element, said movable contact element being moved by said spool into and out of contact with said stationary contact element, said stationary ocntact element and said movable contact element forming a portion of a shift inhibitor circuit for the manual controls for a multiple speed, power transmission mechanism.

2. A switch mechanism comprising a casing, a shaft rotatably journaled in said casing, a carrier member secured to said shaft, a spool slidably carried by said shaft, a pair of weights situated on opposed sides of said shaft, lever means for pivotally mounting said weights on said carrier member including portions engageable with said spool for axially positioning the same, said weights being urged radially outward by centrifugal force as said shaft is rotated, an electrical circuit breaker including a movable contact element engageable with said spool and actuated thereby as the speed of rotation of said shaft changes, and magnets mounted on said carrier member adjacent said lever means for urging said weights toward a radially inward position thereby causing said weights to move quickly from one radial position to another with a snap action, said circuit breaker being double acting and including a pair of adjacent stationary contact elements, said movable contact element being adapted to alternately engage said stationary contact element, said movable contact element being actuated by said spool as it is axially positioned along said shaft, said movable contact element and one of said stationary contact elements forming a portion of a shift inhibitor circuit for the manual controls of a multiple speed, power transmission mechanism and said movable contact element and the other stationary contact element forming a portion of a solenoid valve circuit for a wheeled vehicle no-creep braking mechanism.

3. A switch mechanism comprising a casing, a shaft rotatably journaled in said casing, a carrier member secured to said shaft, a switch actuating element slidably carried by said shaft, a lever member pivotally mounted on said carrier member including portions engageable with said switch actuating element for axially positioning the same, a centrifugal weight secured to said lever member, said weight being urged radially outward by centrifugal force as said shaft is rotated, an electrical circuit breaker including a movable contact element engageable with said switch actuating element and actuated thereby as the speed of rotation of said shaft changes, and a magnet mounted on one of said members, said magnet being adapted to establish a magnetic attraction between said members thereby causing said weight to move quickly from one radial position to another with a snap action, said circuit breaker further including a stationary contact element, said movable contact element being moved by said switch actuating element into and out of contact with said stationary contact element, said stationary contact element and said movable contact element forming a portion of a shift inhibitor circuit for the manual controls of a multiple speed, power transmission mechanism.

References Cited in the file of this patent
UNITED STATES PATENTS

| | | |
|---|---|---|
| 2,432,699 | Taylor | Dec. 16, 1947 |
| 2,446,923 | Hardy | Aug. 10, 1948 |
| 2,677,539 | Winslow | May 4, 1954 |